(12) United States Patent
Basu et al.

(10) Patent No.: US 9,792,782 B1
(45) Date of Patent: Oct. 17, 2017

(54) SYSTEMS AND METHODS FOR TRANSFERRING RESOURCE ACCESS

(71) Applicants: Gourab Basu, Half Moon Bay, CA (US); Rajib Maitra, San Ramon, CA (US); Tirtha Mauli Sarkar, Singapore (SG)

(72) Inventors: Gourab Basu, Half Moon Bay, CA (US); Rajib Maitra, San Ramon, CA (US); Tirtha Mauli Sarkar, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 15/156,633

(22) Filed: May 17, 2016

(51) Int. Cl.
*G07F 19/00* (2006.01)
*G07F 7/10* (2006.01)
(52) U.S. Cl.
CPC .......... *G07F 19/203* (2013.01); *G07F 7/1025* (2013.01)

(58) Field of Classification Search
None
See application file for complete search history.

(56) References Cited

U.S. PATENT DOCUMENTS

2013/0024379 A1* 1/2013 Di Tucci ................ G06Q 20/10
 705/44
2014/0173695 A1* 6/2014 Valdivia ................. G06F 21/36
 726/4

\* cited by examiner

*Primary Examiner* — Kristy A Haupt
(74) *Attorney, Agent, or Firm* — Kilpatrick Townsend & Stockton LLP

(57) ABSTRACT

Systems and methods for transferring resource access from a sender to a recipient are disclosed that can allow a sender to specify an amount of a resource to provide access to (e.g., an amount of money or an amount of access rights), while still providing security for the sender's sensitive credential information (e.g., PAN and/or PIN). These systems and methods can allow a sender to transfer resource access from any location and at any time of the day. In the case of money transfers, the recipient can quickly and directly obtain the money from any ATM location associated with any bank and at any time of the day, even without a bank account.

22 Claims, 6 Drawing Sheets

SYSTEMS AND METHODS FOR TRANSFERRING RESOURCE ACCESS

CROSS-REFERENCES TO RELATED APPLICATIONS

None.

BACKGROUND

There are instances where a sender wants to quickly provide resource access to a recipient. For example, a parent may want to provide money to their child at college without the parent being present. In another example, a parent may want to give a child access rights to a house without the parent being present. However, the parent may not want to give the child full access to his or her payment or access credentials. In addition, the parent may want to ensure that only the child can obtain access to the resource, and not an unauthorized party. Thus, secure systems and methods for transferring resource access to recipients are needed.

An exemplary conventional resource access provider is a money transfer agent. To send money, a sender goes to a location associated with the money transfer agent. The sender pays the money transfer agent an amount of money to be transferred to the recipient plus a convenience fee, and provides information about the recipient (e.g., the recipient's name). To receive the money transfer, the recipient must go to the same or another location associated with the money transfer agent and provide identification confirming the recipient's name.

There are many disadvantages associated with money transfer agents. For example, both the sender and the recipient must go to a location associated with the money transfer agent during business hours, which may not be convenient. In addition, the sender must either pay for the money transfer using cash or a cashier's check, or provide sensitive credentials to the money transfer agent (e.g., PAN, credit card number, bank account number, etc.). This increases the likelihood of fraud against the sender.

Embodiments of the invention address these and other problems, individually and collectively.

SUMMARY

Some embodiments of the present invention relate to systems and methods for transferring resource access from a sender to a recipient that can allow a sender to specify an amount of the resource to provide access to (e.g., an amount of money or an amount of access rights), while still providing security for the sender's sensitive credential information (e.g., PAN and/or PIN). These systems and methods can allow a sender to transfer resource access from any location and at any time of the day. In the case of money transfers, the recipient can quickly and directly obtain the money from any ATM location associated with any bank and at any time of the day, even without a bank account.

According to one embodiment of the invention, a first request to transfer access to a resource from a sender to a recipient is received. The first request includes a credential associated with the sender and a recipient identifier. The credential is associated with a sender code. A token corresponding to the credential and a recipient code associated with the sender code are generated. The token and the recipient code are sent to the recipient using the recipient identifier. Thereafter, a second request to access the resource is received. The second request includes the token and the recipient code. The token is translated into the credential and the recipient code is translated into the sender code. The second request is processed using the credential and the sender code.

Embodiments of the invention are further directed to a server computer comprising a processor and a memory element. The memory element can comprise code, executable by the processor, for implementing the above described method.

These and other embodiments of the invention are described in further detail below.

DETAILED DESCRIPTION

Figure 1:
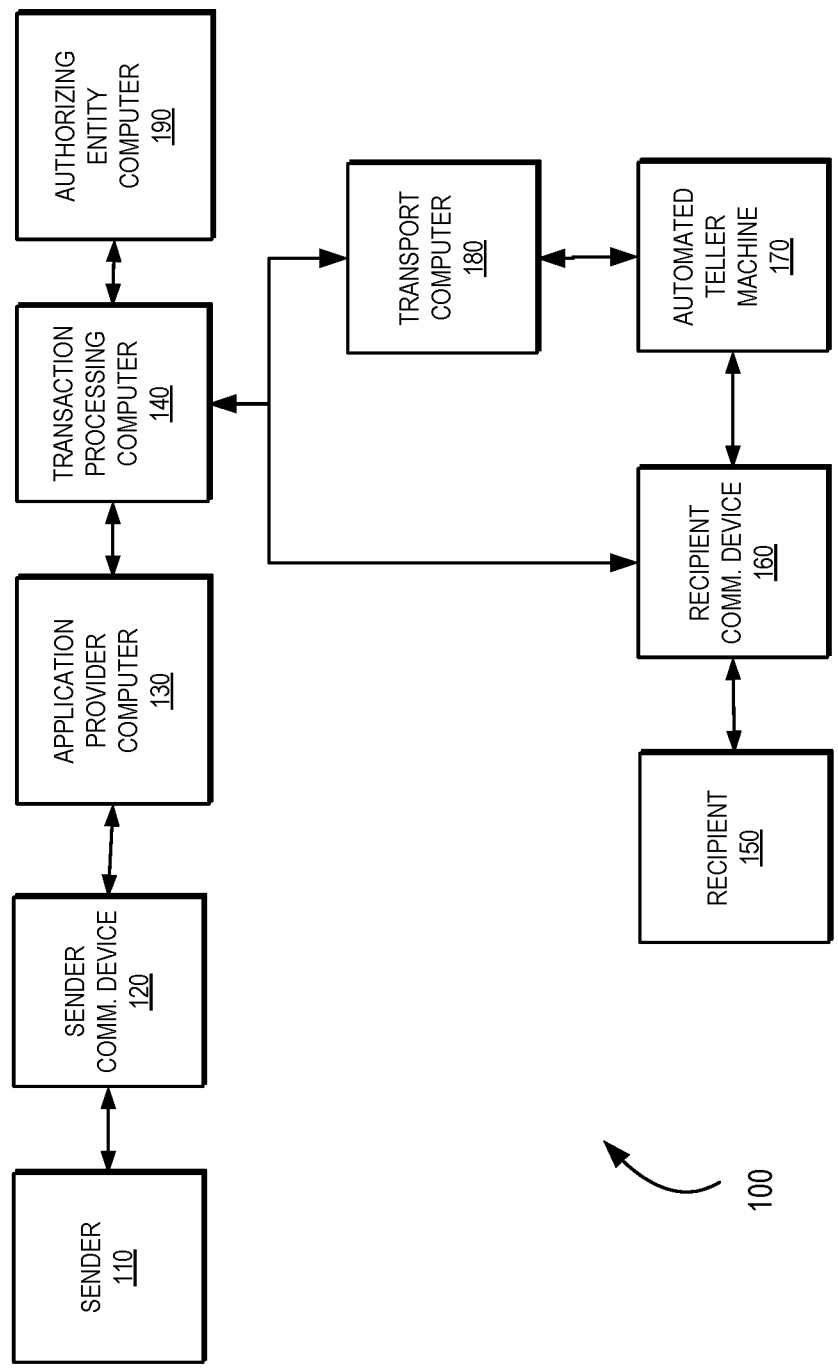
FIG. 1 shows a block diagram of a system according to embodiments of the present invention.

Embodiments of the invention are directed to systems and methods for transferring resource access from a sender to a recipient. The sender submits a request to transfer access to the resource, along with the sender's credential (e.g., debit account number) and a recipient identifier (e.g., a mobile phone number). The sender's credential is associated with a sender code (e.g., a PIN number). The request may further specify an amount or quantity of the resource. For example, the request may specify that $100 should be transferred to the recipient from the sender's debit account.

Once the request is received, a token is generated that corresponds to the sender's credential, and a recipient code (e.g., a PIN number) is generated that is associated with the sender code. The token and the recipient code are sent to the recipient using the recipient identifier. For example, if the recipient identifier provided by the sender in the request is a mobile phone number, the token and the recipient code can be text messaged to the recipient, or communicated to the recipient in a voice call. In another example, if the recipient identifier provided by the sender in the request is an e-mail address, the token and the recipient code can be e-mailed to the recipient.

At any point thereafter, the recipient can submit a request to access the resource, including the token and the recipient code. For example, the recipient can go to an ATM, enter the token and PIN number, and request withdrawal of the transferred funds. Once the request is received from the recipient, the token is translated into the sender's credential, and the recipient code is translated into the sender code. Then, the recipient's request is processed using the sender's credential and the sender code. For example, the recipient's request may be processed as a typical ATM withdrawal from the sender's debit account.

Before discussing specific embodiments and examples, some descriptions of terms used herein are provided below.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "application provider" may be an entity that can provide a service or application. An example of an application provider is a digital wallet provider.

An "authorization request message" may be a message to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, a PIN number, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "code" may comprise any combination of letters, numbers and/or symbols of any length used to protect access to a resource. Examples of codes include PIN numbers, passwords, access codes, keys, seeds, and the like. A code may be associated with a particular party. For example, a code associated with a sender may be referred to as a "sender code", and/or a code associated with a recipient may be referred to as a "recipient code".

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "identifier" can include any combination of letters, numbers, symbols and/or images identifying something. Certain identifiers may be used to communicate with a party. Examples of these identifiers include e-mail addresses, website addresses, IP addresses, communication device identifiers, phone numbers, physical addresses, and the like. An identifier may be associated with a party. For example, a "recipient identifier" may be an identifier associated with a recipient (e.g., a recipient mobile phone number).

An "issuer" may typically refer to a business entity (e.g., a bank) that maintains an account for a user. An issuer may also issue payment credentials stored on communications devices.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "resource" may comprise any tangible or intangible asset. Examples of resources include goods, services, money, information, buildings, houses, data, files, applications, and the like.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "token" may include a substitute identifier for some information. For example, an access token may be a substitute or subordinate identifier for an access credential. In another example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

I. Systems

Various systems may be used to implement the methods of transferring resource access described herein. FIG. 1 shows a block diagram of a system 100 according to embodiments of the present invention. The system 100 includes a sender communication device 120, a recipient communication device 160, an application provider computer 130, a transaction processing computer 140, a transport computer 180, an authorizing entity computer 190, and an automated teller machine (ATM) 170. Each of these systems and computers may be in operative communication with each other. In some embodiments, the sender communication device 120 may be operated by a sender 110, and the recipient communication device 160 may be operated by a recipient 150.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

Sender 110 may operate sender communication device 120 to send a request to transfer access to a resource from sender 110 to recipient 150 via recipient communication device 160. Each of communication devices 120 and 160 may be any device suitable to carry out transactions, such as financial transactions, or any other additional related actions. One or both of communication device 120 and 160 may include a memory that may store a digital wallet application or other payment application. The application may be provisioned with account information (e.g., a credential or token) to enable each communication device to conduct transactions (e.g., sending and receiving money). Each of communication device 120 and 160 may also include a secure element that can be implemented in either hardware and/or software, which may store sensitive account or personal information. Communication devices 120 and 160 may communicate over a communication network with one or more entities, including application provider computer 130, transaction processing computer 140, and/or ATM 170.

The application provider computer 130 may be operated or associated with an application provider. The application provider may be an entity that provides an application to a communication device for use by a user (e.g., a sender or recipient). In some embodiments, the application provider can be a digital wallet provider that provides a digital wallet or payment application to a communication device. The application provider computer 130 may maintain one or more digital wallets for each user, and each digital wallet may be associated with payment data for one or more payment accounts. Examples of digital wallets may include Visa Checkout™ or Google™ Wallet, etc. In another embodiment, the application provider can be a money transfer provider that provides a user interface facilitating transfers of money between parties.

The application provider computer 130 may comprise a server computer to facilitate the provisioning process. The server computer may include a processor and a computer readable medium coupled to the processor, the computer readable medium comprising code, executable by the processor for performing the functionality described in further detail below. The server computer may send and receive over-the-air (OTA) messages to a digital wallet application stored on the communication device 120 or 160.

The transaction processing computer 140 may be associated with one or more payment service providers. The transaction processing computer 140 may include any entity that provides provisioning services and/or that interfaces with an ATM 170, either directly or indirectly, to facilitate money transfers. The transaction processing computer 140, via a provisioning service module, may provide provisioning services to the application provider computer 130, in which the application provider computer 130 may utilize an application programming interface (API) to communicate with the transaction processing computer 140.

In some embodiments, the transaction processing computer 140 may include modules that provide additional services, including but not limited to a token generation module that can generate and/or provide a "payment token"

that is associated with sensitive data (e.g., account information). For example, the token generation module may generate a payment token that can be used as a substitute for a real account identifier (e.g., a Primary Account Number (PAN) of an account), and maintain a stored association (e.g., mapping) between the payment token and the PAN, such that a token exchange module is able to "translate" the payment token back to the original PAN. In some embodiments, the payment token is mathematically derived from the original PAN. In other embodiments, the payment token is randomly generated with respect to the original PAN, and is simply linked to it in a data table. Regardless of how the payment token is generated from the PAN and vice versa, the use of a payment token instead of a real account identifier during a transaction can provide enhanced security. In some embodiments, the payment token and/or information regarding the payment token may be stored in a token vault or database. These embodiments are described in further detail herein, particularly with respect to FIG. 4.

The transaction processing computer 140 may comprise a server computer. The server computer may include a processor and a computer readable medium coupled to the processor, the computer readable medium comprising code, executable by the processor, for performing the functions described herein.

The transport computer 180 is typically a system for an entity (e.g., a bank) that has a business relationship with a particular entity (e.g., a bank associated with, controlling, or maintaining a particular ATM 170). The transport computer 180 may generate and route an authorization request message for a transaction (e.g., for a money withdrawal at ATM 170) to the authorizing entity computer 190 via transaction processing computer 140. The transport computer 180 may comprise a server computer. The server computer may include a processor and a computer readable medium coupled to the processor, the computer readable medium comprising code, executable by the processor, for performing the functions described herein.

In some embodiments, the authorizing entity computer 190 may communicate with the transaction processing computer 140 to authorize transactions. The authorizing entity computer 190 is typically run by a business entity (e.g., a bank) that may have issued the credential or payment tokens used for the transactions (e.g., the money transfers). Some systems can perform both authorizing entity computer 190 and transport computer 180 functions. When a transaction involves a credential (e.g., a payment account) associated with the authorizing entity computer 190, the authorizing entity computer 190 may verify the account and respond with an authorization response message to the transport computer 180 via the transaction processing computer 140, that may be forwarded to the corresponding recipient 150 and/or recipient communication device 160. The authorizing entity computer 190 may comprise a server computer. The server computer may include a processor and a computer readable medium coupled to the processor, the computer readable medium comprising code, executable by the processor, for performing the functions described herein.

The transport computer 180, the transaction processing computer 140, and the authorizing entity computer 190 are further configured to perform a clearing and settlement process at a later time after a transaction has been completed (e.g., at the end of the day).

Figure 2:
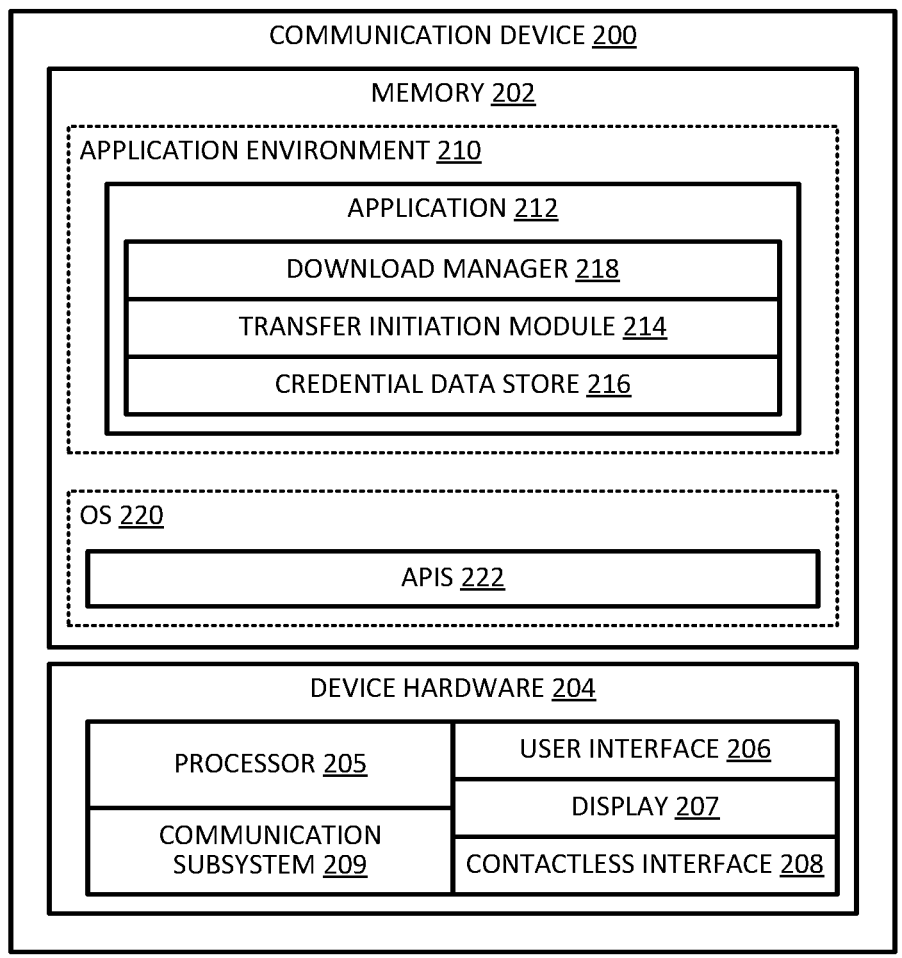
FIG. 2 shows a block diagram of a communication device according to embodiments of the present invention.

FIG. 2 shows a block diagram of a communication device 200 according to embodiments of the present invention. Communication device 200 may be used to implement sender communication device 120 and/or recipient communication device 160 of FIG. 1, for example. Communication device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Device hardware 204 may also include a contactless interface 208, for example, in some embodiments in which communication device 200 is a portable communication device. Processor 205 can be implemented as one or more integrated circuits (e.g., one or more single core or multicore microprocessors and/or microcontrollers), and is used to control the operation of communication device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by portable communication device 200 to communicate with other devices and/or to connect with external networks. User interface 206 can include any combination of input and output elements to allow a user to interact with and invoke the functionalities of communication device 200. In some embodiments, user interface 206 may include a component such as display 207 that can be used for both input and output functions.

Contactless interface 208 may include one or more specialized RF transceivers (e.g., near field communication (NFC) transceivers) to interact with a contactless reader of another device to conduct a transaction (e.g., money transfer, money withdrawal, payment transaction, access transaction, information exchange, etc.). For example, communication device 200 may utilize contactless interface 208 to wirelessly communicate a credential or token and/or PIN number to an ATM (e.g., ATM 170 of FIG. 1). In secure element based implementations, only a secure element (not shown) may have access to contactless interface 208. In some embodiments, contactless interface 208 can be accessed by the mobile OS 220 using specialized card emulation APIs 222 without requiring the use of a secure element.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 220 and an application environment 210 where one or more applications reside including application 212 to be executed by processor 205. In some embodiments, OS 220 may implement a set of card emulation APIs 222 that can be invoked by application 212 to access contactless interface 208 to interact with an access device.

Application 212 can include an application that uses, accesses, and/or stores sensitive information, credentials and/or tokens. For example, application 212 can include a digital wallet or payment application that uses credentials to conduct transactions (e.g., money transfers or withdrawals) via communication device 200. In some embodiments, access to application 212 by a user can be protected by user authentication data such as a password, passcode, PIN, etc. For example, when a user attempts to launch or execute application 212, the user may be requested to enter valid user authentication data before the user can access application 212. Application 212 may include a download manager 218, a transfer initiation module 214, and a credential (e.g., token and/or payment credentials) data store 216. In some embodiments, one or more of these components can be provided by another application or component that is not part of application 212.

Download manager 218 can be programmed to provide functionalities to communicate with an application provider associated with application 212 to download information via the application provider. Download manager 218 working in conjunction with the processor 205 may request or otherwise manage the acquisition and/or storage of credentials. For example, download manager 218 working in conjunction with the processor 205 may request and/or obtain credentials via the application provider associated with application 212, and store the credentials in credential data store 216. In another example, download manager 218 working in conjunction with the processor 205 may obtain tokens via a transaction processing computer, and store the tokens in credential data store 216. In some embodiments, the credentials and/or tokens can be received in an encrypted form. For example, the credentials can be encrypted with a session key generated by a server computer. Download manager 218 working in conjunction with the processor 205 may also receive, from the application provider, the session key in an encrypted form, and store the encrypted session key in credential data store 216.

In certain embodiments, application 212 may have a cryptography module (not shown) working on conjunction with the processor 205 to provide cryptographic functionalities for application 212. For example, the cryptography module may implement and perform encryption/decryption operations for application 212 using encryption algorithms such as DES, AES, TDES, or the like, and/or hash functions such as SHA, or the like. For example, when application 212 accesses credential data store 216 to retrieve and use the credentials and/or tokens stored therein (e.g., to conduct a transaction, perform a money transfer, or request a withdrawal), application 212 may invoke the cryptography module to decrypt the session key that is used to encrypt the stored credentials, and then decrypt the credentials using the decrypted session key. The decrypted credentials and/or tokens can then be used by application 212.

In some embodiments (e.g., when communication device 200 is sender communication device 120 of FIG. 1), application 212 may further include a transfer initiation module 214. The transfer initiation module 214 may, in conjunction with the processor 205, receive requests to initiate transfers of money from a sender to a recipient. When initiated, application 212 may allow a sender to select a credential from credential data store 216 that will be used to transfer the money (or to add a new credential to credential data store 216 that will be used to transfer the money), to enter a recipient identifier (e.g., a mobile phone number), and an amount for the transfer. Application 212 may then use communication subsystem 209 to communicate the request details to an application provider computer (e.g., application provider computer 130 of FIG. 1).

Figure 3:
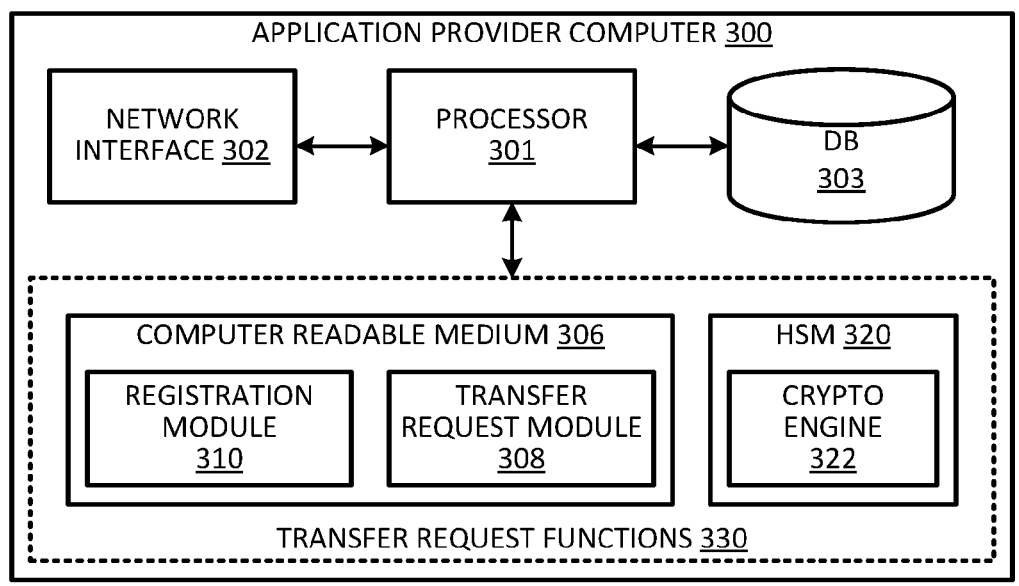
FIG. 3 shows a block diagram of an application provider computer according to embodiments of the present invention.

FIG. 3 shows a block diagram of an application provider computer 300 according to embodiments of the present invention. Application provider computer may be implemented as application provider computer 130 of FIG. 1, for example. Application provider computer 300 may be associated with an application provider, according to some embodiments. For example, application provider computer 300 can provide a software application or services associated with the application for a communication device (e.g., application 212 of FIG. 2). Application provider computer 300 may include a processor 301 coupled to a network interface 302 and a computer readable medium 306. In some embodiments, application provider computer 300 may also include a host security module (HSM) 320. Application provider computer 300 may also include or otherwise have access to a database 303 that may be internal or external to service provider computer 300.

Processor 301 may include one or more microprocessors to execute program components for performing the transfer request functions 308 of application provider computer 300. Network interface 302 can be configured to connect to one or more communication networks to allow application provider computer 300 to communicate with other entities such as a communication device operated by a user, a server computer, etc. Computer readable medium 306 may include any combination of one or more volatile and/or non-volatile memories, for example, RAM, DRAM, SRAM, ROM, flash, or any other suitable memory components. Computer readable medium 306 may store code executable by the processor 301 for implementing some or all of the transfer request functions 330 of service provider computer 300. For example, computer readable medium 306 may include code implementing a registration module 310 and a transfer request module 308. In some embodiments, application provider computer 300 may also include a host security module (HSM) 320 to implement a cryptography engine 322.

Registration module 310 may work in conjunction with the processor 301 to register users with application provider computer 300. For example, a user can be registered with the application provider by providing registration module 310 with user-identifying information to identify the user, device information such as a device identifier associated with the user's communication device on which an application associated with the application provider is installed, account information such as an account identifier associated with the user's account, etc. In some embodiments, a user may set up user authentication data (e.g., password, passcode, PIN, etc.) using the registration module 310 and the processor 301. The user authentication data can be used by application provider computer 300 to authenticate the user when the application on the user's communication device communicates with service provider computer 300. Registration module 310 may work in conjunction with the processor 301 to also allow a user to change or update the user authentication data. The registration information can be stored in a database 303. In some embodiments, the registration process can be carried out when the user first downloads the application for installation on the user's communication device, or when the user first launches and executes the application.

Transfer request module 308 is programmed to process requests for money transfers received from the application installed on a user's communication device. In some embodiments, upon receiving a request from the application on the user's communication device, transfer request module 308 in conjunction with the processor 301 may authenticate the user and/or the communication device by verifying the user authentication data and device identifier of the communication device against the previously registered information stored in database 303. Transfer request module 308 working in conjunction with the processor 301 may then forward the request for money transfer to a transaction processing computer (e.g., transaction processing computer 140 of FIG. 1). The request may be treated as a request to generate a token and PIN to be used in a withdrawal for a particular amount of money.

Cryptography engine 322 (which may work with a separate data processor in the HSM 320) may provide cryptographic functionalities for application provider computer 300. In some embodiments, cryptography engine 322 can be implemented in HSM 320, which is a specialized hardware or isolated software component used to perform cryptographic operations and manage cryptographic keys. Cryptography engine 322 may be programmed to implement and perform encryption/decryption operations for application provider computer 300 using encryption algorithms such as such as AES, DES, TDES, or other suitable encryption algorithms using cryptographic keys of any length (e.g., 56-bit, 128-bit, 169-bit, 192-bit, 256-bit, etc.). In some embodiments, cryptography engine 322 can also be programmed to perform hash calculations using hash functions such as secure hash algorithm (SHA), or the like. For example, when application provider computer 300 receives a session key used for encrypting credentials from a server computer, application provider computer 300 may invoke cryptography engine 322 to encrypt the session key, such that session key can be provided to the application on the communication device in an encrypted form. In some embodiments, the session key can be encrypted using a hash value that is computed over the user authentication data associated with the user requesting the credential.

Figure 4:
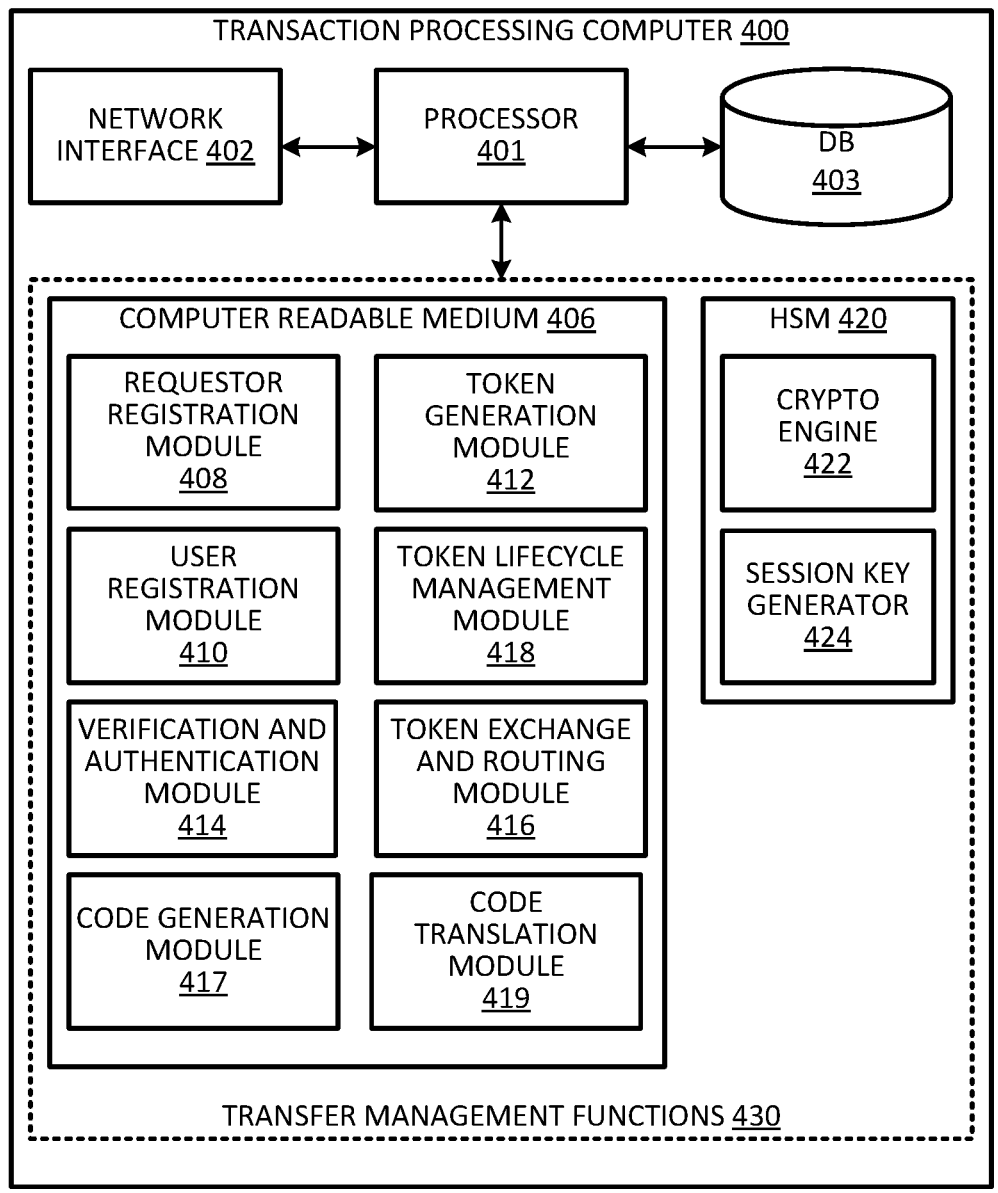
FIG. 4 shows a block diagram of a transaction processing computer according to embodiments of the present invention.

FIG. 4 shows a block diagram of a transaction processing computer 400 according to embodiments of the present invention. Transaction processing computer 400 may be used to implement transaction processing computer 140 of FIG. 1, for example, and may include a token server and/or PIN server. Transaction processing computer 400 may include a processor 401 coupled to a network interface 402 and a computer readable medium 406. In some embodiments, transaction processing computer 400 may also include a host security module (HSM) 420. Transaction processing computer 400 may also include a credential, token and/or PIN registry that may be internal or external to server computer 400.

Processor 401 may include one or more microprocessors to execute program components for performing the transfer management functions 430 of transaction processing computer 400. Network interface 402 may be configured to connect to one or more communication networks to allow transaction processing computer 400 to communicate with other entities such as a communication device operated by a user, an application provider computer or a transfer request computer, resource provider computer (e.g., merchant computer), transport computer (e.g., acquirer computer), authorizing entity computer (e.g., issuer computer), etc. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the transfer management functions 430 of transaction processing computer 400 described herein. For example, computer readable medium 406 may include a requestor registration module 408, a user registration module 410, a token generation module 412, a verification and authentication module 414, a token exchange and routing module 416, a token lifecycle management module 418, a code generation module 417, and/or a code translation module 419.

Requestor registration module 408 may, in conjunction with the processor 401, register a token requestor entity (e.g., application provider) with the token database 403, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 408 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment, etc.), integration and connectivity parameters, and services subscribed (e.g., token request, authentication and verification, lifecycle management, etc.) and any other relevant information for the onboarding process.

User registration module 410 may, in conjunction with the processor 401, perform registration of users and accounts of the users. In some embodiments, transaction processing computer 400 may allow authorized entities to register consumer accounts (e.g., payment or financial accounts, tokens, etc.) with the network credential system on behalf of the users. For example, a registered token requestor may provide a token requestor ID (e.g., received at the time of registration from the requestor registration module 408), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 410 working in conjunction with the processor 401 may store the account details and sensitive information in token database 403 for all successful activation and registration requests. In some embodiment, an authorized entity may also unregister users and accounts by providing the necessary information to transaction processing computer 400.

Token generation module 412 can be programmed to generate a token or retrieve sensitive information in response to processing a request for a token (e.g., initiated by a request to transfer money) from a token requestor (e.g., an application provider). In some embodiments, token generation module 412 may be programmed to receive a token requestor ID and an account identifier or sensitive information identifier. In some embodiments, token generation module 412 may also be programmed to receive optional information such as a user name, a user address and zip code, a requested token or sensitive information type (e.g., static, dynamic, non-payment, etc.), device identifier, and/or suitable information. In some embodiments, token generation module 412 may be programmed to generate a response with the requested token or requested sensitive information, a token expiration date associated with the token, and/or a token assurance level associated with the token. In some embodiments, token generation module 412 may be programmed to validate the token requestor ID and maintain the correlation between the token, the sensitive information or credential being substituted by the token, and the associated token requestor. In some embodiments, token generation module 412 may be programmed to determine if a token already exists in the token registry for a token request before generating a new token. In some embodiments, if a token cannot be provisioned, the token response may include a corresponding reason code. In some embodiments, token generation module 412 may also be programmed to provide an interface to the token requestors to submit a bulk token request file.

In some embodiments, the token may be generated on the fly using API calls. For example, when a request is received to tokenize a credential or other sensitive information, token generation module 412 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. The database 403 may store the relationship of the token range to the credential, and a token add record may be logged. In some embodiments, token generation module 412 may consider the token range list associated with the account identifier range before assigning a token.

Verification and authentication module 414 may, in conjunction with the processor 401, execute a consumer verification and authentication process, and determine a token assurance level based on the outcome of the verification and authentication process. For example, the verification and authentication module 414, working in conjunction with the processor 401, can perform consumer authentication and verification through a configured authentication scheme. In some embodiments, the authentication scheme may include verification of the credential, verification values, the expiration date, and/or a delivery channel identifier based on the customer information stored in a database associated with the transaction processing network. In some embodiments, the authentication scheme may include direct verification of the consumer by the issuer using consumer credentials for their online banking system.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 416 may, in conjunction with the processor 401, process requests for any underlying sensitive information (e.g., a credential) associated with a given token. For example, a transaction processing network, acquirer, issuer, etc. may issue a request for a token exchange during processing of a transaction. Token exchange and routing module 416 may, in conjunction with the processor 401, validate that the requesting entity is entitled to make a request for a token exchange. In some embodiments, token exchange and routing module 416 may, in conjunction with the processor 401, validate the credential (or other sensitive information) to token mapping and presentment mode based on the transaction timestamp and the token expiration timestamp. Token exchange and routing module 416 may, in conjunction with the processor 401, retrieve the credential (or other sensitive information) from database 403, and provide it along with the assurance level to the requesting entity. In some embodiments, if the credential (or other sensitive information) to token mapping is not valid for the transaction timestamp and presentment mode, an error message may be provided.

Token lifecycle management module 418 may, in conjunction with the processor 401, perform lifecycle operations on the tokens managed by transaction processing computer 400. Lifecycle operations may include canceling a token, activating or deactivating a token, updating token attributes, renewing token with a new expiration date, etc. In some embodiments, a token requestor entity may provide a token requestor ID, a token number, a lifecycle operation identifier and one or more token attributes to transaction processing computer 400 to perform the requested lifecycle operation on a given token. Token life-cycle management module 418 may verify the token requestor ID and the token association based on information in database 403. Token lifecycle management module 418 may, in conjunction with the processor 401, perform the requested lifecycle operation on a given token, and update the corresponding associations in database 403. Examples of lifecycle operation may include a token activation operation to activate an inactive, suspended, or temporarily locked token and its associations; a token deactivation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

Code generation module 417 can be programmed to generate a code (e.g., a recipient PIN number) in response to processing a request to transfer money to a recipient received from an application provider. Code generation module 417 may, in conjunction with processor 401, generate a recipient code using a sender code associated with the credential used in the request. The sender code may be received with the request to transfer money, or may be requested from an authorizing entity computer associated with the credential. In one embodiment, the recipient code to be generated is specified by the request. The recipient code and sender code can then be stored in association in database 403 (e.g., in a look-up table), along with the credential and its associated token. The recipient code may be generated with particular limitations or conditions (e.g., one time use, limited time use, etc.).

In some embodiments, code generation module 417 may be programmed to generate a response with the requested code, and/or a code expiration date or number of uses associated with the code. In some embodiments, code generation module 417 may be programmed to determine if a code already exists in the database for a transfer request before generating a new code. In some embodiments, if a code cannot be generated, the code response may include a corresponding reason code. In some embodiments, the code may be generated on the fly using API calls.

Code translation module 419 may, in conjunction with the processor 401, process requests for an underlying code (e.g., a sender code) associated with a given recipient code. For example, an ATM, transport computer, authorizing entity computer, etc. may issue a request for a code exchange during processing of a transaction. Code translation module 419 may, in conjunction with the processor 401, validate that the requesting entity is entitled to make a request for a code translation. Code translation module 419 may, in conjunction with the processor 401, retrieve the sender code from database 403 (e.g., using a look-up table), and provide it to the requesting entity. In some embodiments, if the recipient code to sender code mapping is not valid for a particular timestamp or transaction count, an error message may be provided.

Transaction processing computer 400 may include any of a number of additional modules for also processing payment transactions between a resource provider and a consumer, for example. In one embodiment, transaction processing computer 400 further includes a communications module, a database look-up module, a database update module, a report generation module, an authorization module, a settlement module, and/or an authorization database (not shown).

The communications module may be configured or programmed to receive and generate electronic messages comprising information transmitted through the transaction processing computer 400, in conjunction with the processor 401. When an electronic message is received by the transaction processing computer 400 via network interface 402, it may be passed to the communications module. The communications module may identify and parse the relevant data based on a particular messaging protocol used in the transaction processing computer 400 in conjunction with the processor 401. The received information may comprise, for instance, identification information, transaction information, and/or any other information that the transaction processing computer 400 may utilize in authorizing a financial transaction or performing a settlement and clearing procedure. The communication module may then transmit any received information to an appropriate module within the transaction processing computer 400, in conjunction with the processor 401. The communication module may also receive information from one or more of the modules in transaction processing computer 400 and generate an electronic message in an appropriate data format in conformance with a transmission protocol used in the transaction processing system so that the message may be sent to one or more components within the system 100 of FIG. 1, for example. The electronic message may then be passed to the network interface 402 for transmission. The electronic message may, for example, comprise an authorization response message or may be an authorization request message, for example.

The database look-up module may be programmed or configured to perform some or all of the functionality associated with retrieving information from one or more databases, in conjunction with the processor 401. In this regard, the database look-up module may receive requests from one or more of the modules of transaction processing computer 400 for information that may be stored in one or more of the databases. The database look-up module may then determine and a query an appropriate database, in conjunction with the processor 401. The database update module may be programmed or configured to maintain and update the databases, such as authorization database. In this regard, the database update module may receive information about a user, financial institution, a payment device, and/or current or past transaction information from one of the modules discussed herein. This information may then be stored in the appropriate location in the database using any suitable storage process.

The report generation module may be programmed or configured to perform some or all of the functionality associated with generating a report regarding a user, an account, a transaction or transactions, or any other entity or category of information with regard to the transaction processing computer 400, in conjunction with the processor 401. This may include, for instance, identifying patterns (such as patterns that indicate a fraudulent transaction or transactions) and generating one or more alerts that may be sent (e.g. via the communications module and network interface 402) to one or more entities in the system (e.g., system 100 of FIG. 1), including a user, a resource provider, or an authorizing entity. The report generation module may also, for example, request information from one or more of the databases via the database look-up module, in conjunction with the processor 401.

The authorization module may be configured or programmed to perform some or all the functionality associated with authorizing a financial transaction associated with an authorization request message, in conjunction with the processor 401. The authorization request message may be generated by a resource provider computer and may be associated with a transaction involving a credential or token. The authorization request message may include any suitable information that may be used to authorize or identify the transaction, and may be generated by the resource provider computer in response to an interaction between a credential or a communication device and an access device associated with the resource provider computer. The authorization module may, for instance, be programmed or configured to compare the information received via the authorization request message with stored information at the transaction processing computer 400 (such as comprising verification values). In some embodiments, if the received and stored values match, the authorization module may authorize the transaction (or may be more likely to authorize the transaction) and may instruct the communication module to generate an authorization response message, in conjunction with the processor 401. The authorization module may also be programmed or configured to execute any further operations associated with a typical authorization.

The transaction processing computer may include one or more additional databases as well, such as an authorization database. The authorization database may contain information related to a credential or token, as well as any other suitable information (such as transaction information) associated with the credential or token. For example, the authorization database may comprise a relational database having a plurality of associated fields, including a primary account identifier (e.g., a PAN), an authorizing entity associated with the account, expiration date of a particular credential or token, verification value(s), an amount authorized for a transaction, a user name, user contact information, prior transaction data, etc. In some embodiments, the authorization module may utilize some or all of the information stored in the authorization database when authorizing a transaction.

According to some embodiments, transaction processing computer 400 may include an HSM 420 to perform secure functions such as encryption and decryption operations and generation of cryptographic keys used for the encryption and decryption operations. For example, HSM 420 may include a cryptography engine 422 to execute encryption algorithms such as AES, DES, TDES, or other suitable encryption algorithms using cryptographic keys of any length (e.g., 56-bit, 128-bit, 169-bit, 192-bit, 256-bit, etc.). HSM 420 may also implement a session key generator 424 to generate a session key for each token request that transaction processing computer 400 processes. The generated session key can be used to encrypt a token generated or retrieved for the request, and the token can be provided to the token requestor in an encrypted form. For example, for each request that transaction processing computer 400 receives and processes, session key generator 424 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and transaction processing computer 400. Token generation module 412 may, in conjunction with the processor 401, generate or otherwise retrieve a token to fulfill the request. The session key can be used by cryptography engine 422 and the processor 401 to encrypt that token using an encryption algorithm, and the encrypted token can be provided to the token requestor. In some embodiments, the generated session key is also provided to the token requestor with the encrypted token.

Although transaction processing computer 400 and application provider computer 300 have been described with a HSM implementing only some of their functions, it should be understood that other functionalities of the respective computers (e.g., token generation) can be implemented inside an HSM as well. Furthermore, some or all of the respective HSM functionalities can also be implemented outside of a HSM.

II. Methods

Figure 5:
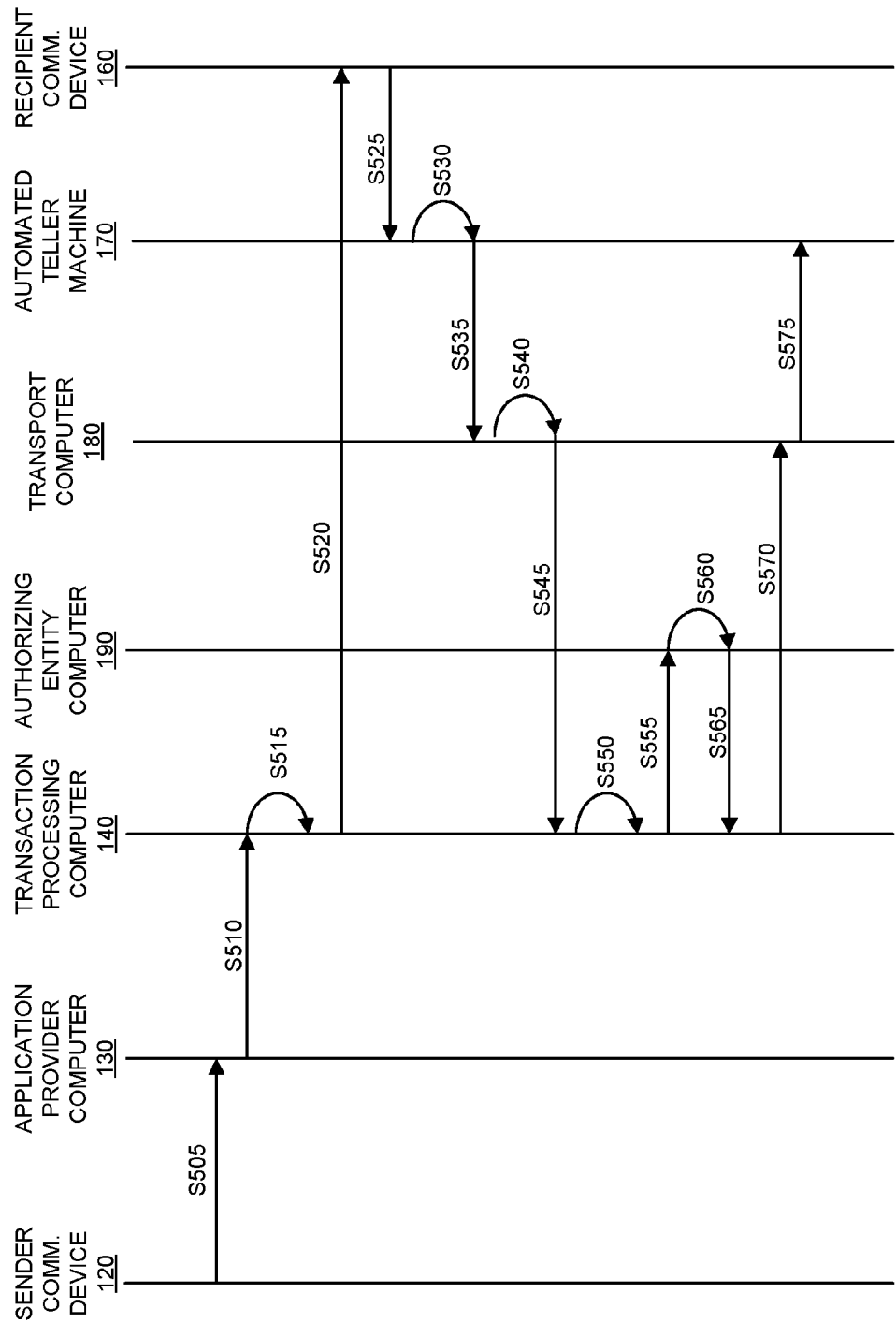
FIG. 5 shows a flowchart of a method for transferring resource access according to embodiments of the present invention.

A method according to embodiments of the invention can be described with respect to FIG. 5, which shows a flowchart of a method for transferring resource access. FIG. 5 includes sender communication device 120, application provider computer 130, transaction processing computer 140, recipient communication device 160, ATM 170, transport computer 180, and authorizing entity computer 190, all corresponding to the similarly numbered entities described with respect to FIG. 1.

Optionally, prior to the steps illustrated in FIG. 5, the sender communication device 120 performs an initial registration with application provider computer 130. The initial registration may include providing a credential (e.g., a debit account number) to the application provider computer 130. The application provider computer 130 may provide this credential to the transaction processing computer 140 for registration with the transaction processing computer 140. The transaction processing computer 140 can then store this credential on file for later use in money transfers.

At step S505, the sender communication device 120 sends a request to transfer money to a recipient to an application provider computer 130. The request includes a credential (e.g., a debit account number) associated with the sender and a recipient identifier (e.g., a recipient mobile phone number). The credential is associated with a sender code (e.g., a sender PIN number associated with the debit account), which can be included in the request, or could have been previously provided to the application provider computer 130 and/or the transaction processing computer 140 as part of an initial registration process. The request may further specify an amount for the money transfer.

At step S510, the application provider computer 130 forwards the request, including all accompanying information, to the transaction processing computer 140. At step S515, the transaction processing computer 140 receives the request, and generates a token corresponding to the credential and a recipient code associated with the sender code. In one embodiment, the recipient code is specified in the request (e.g., by the sender). In another embodiment, the recipient code is generated randomly. The token, credential, sender code, and recipient code may all be stored in association at the transaction processing computer 140.

The token and recipient code may be generated as subject to one or more conditions in one embodiment. The conditions may be specified by the sender in the request (or in the initial registration process), or may be requirements of the application provider computer 130 and/or the transaction processing computer 140. For example, the token and/or recipient code may be for one-time use (i.e., valid for only one withdrawal), limited-time use (i.e., valid for only a certain number of withdrawals, valid for only a certain amount of time, etc.), and/or valid at only certain locations (e.g., certain banks' ATMs, certain particular ATMs, certain geographic locations, etc.). If these conditions are not met, the withdrawal may be denied and/or the token and/or recipient code may be marked expired or invalid.

At step S520, the transaction processing computer 140 sends the token and the recipient code to the recipient using the recipient identifier. This message may further include any other relevant information about the money transfer, such as the amount, a sender identifier (e.g., a sender's name), and/or any conditions placed on the token and/or recipient code. The recipient identifier may dictate how the token and the recipient code are sent to the recipient. For example, if the request specified a mobile phone number as the recipient identifier, the token and the recipient code may be sent the recipient via the mobile phone (e.g., by text message or voice call), such as is shown in FIG. 5. However, in other embodiments, if the request specified an e-mail address as the recipient identifier, the token and the recipient code may be sent to the recipient by e-mail. Further, if the request specified a home address as the recipient identifier, the token and the recipient code may be sent by mail. In one embodiment, if received on recipient communication device 160, the token and/or PIN may be provisioned onto recipient communication device 160. In such an embodiment, the token and/or PIN may be used for a contactless withdrawal at ATM 170, as described further herein. In one embodiment, the sender can cancel the transfer to the recipient at any point up to step S520, invalidating the token and/or the recipient code.

At step S525, the recipient communication device 160 communicates with the ATM 170 to request withdrawal of the money. The request includes the token and the recipient code received by the recipient at step S525. Optionally, the request includes an amount of money for the withdrawal as well. The amount of money may be the entire amount of money specified by the sender, or may be a portion of the money. In one embodiment in which only a portion of the money is requested to be withdrawn, the token and/or recipient code may be used more than once by the recipient until the entire amount of money is withdrawn.

In other embodiments, the entire amount of money specified by the sender's request will be provided to the recipient in the withdrawal, without input from the recipient. As such, an amount of money need not be provided by the recipient in those embodiments. Instead, the entire amount of money will be specified by the transaction processing computer 140 before sending the authorization request message to the issuer.

Communication between the recipient communication device 160 and the ATM 170 may be wired or wireless, or direct or indirect. For example, in one embodiment, the recipient may plug the recipient communication device 160 into the ATM 170 to transfer the token and/or the recipient code. In another example, the recipient may transfer the token and/or the recipient code to the ATM 170 from the recipient communication device 160 by WiFi, a cellular network, or NFC (e.g., using a contactless chip). In still another example, the recipient may read the token and/or the recipient code from the recipient communication device 160 (or any other medium for hosting the information) and manually enter it into the ATM 170. This is advantageous in that recipient communication device 160 need not have contactless communication capabilities, and/or need not have WiFi, cellular coverage, or particular wires, in order to request the withdrawal.

At step S530, the ATM 170 receives the token and the recipient code, adds transaction details (e.g., currency) and business environment details (e.g., ATM identifier, date of transaction, time of transaction, etc.), and generates a payment message with the information. The ATM 170 may encrypt the recipient code before including it in the payment message in one embodiment.

At step S535, the ATM 170 sends the payment message to the transport computer 180. The transport computer 180 may be associated with a bank that is controlling or maintaining the ATM 170. At step S540, the transport computer 180 generates an authorization request message from the payment message. At step S545, the transport computer 180 sends the authorization request message to the transaction processing computer.

At step S550, the transaction processing computer 140 receives the authorization request message, including the token and the recipient code, and optionally determines whether the conditions specified for the token and/or the recipient code have been met. If they have been met, the transaction processing computer 140 translates the token into the credential and the recipient code into the sender code. For example, the token provided by the recipient may be translated into the sender's debit account number, and the PIN number provided by the recipient may be translated into the sender's PIN number. This information was all stored in association with each other at step S515 by the transaction processing computer 140, allowing for quick translation (e.g., retrieval from a look-up table). The transaction processing computer 140 may then update the authorization request message to include the credential and the sender code.

Translation of the token into the credential and the recipient code into the sender code in this manner provides numerous advantages. For example, a resource can be transferred from a sender to a recipient while still providing security for the sender's sensitive credential information (e.g., PAN and/or PIN). In the financial context, a new PAN or new PIN directly associated with the account does not need to be generated to allow a recipient to quickly and directly obtain money from any ATM location associated with any bank and at any time of the day, even without a bank account. Further, the request may be processed as a standard ATM withdrawal from the sender's account, even though the token and recipient code are not directly linked to the sender's account.

The authorization request message may be handled as a typical ATM withdrawal request. At step S555, the transaction processing computer 140 determines the authorizing entity associated with the credential, and forwards the authorization request message including the credential, the sender code and the amount to the authorizing entity computer 190 associated with the proper authorizing entity. At step S560, the authorizing entity computer 190 determines whether there are enough funds in the account associated with the credential to perform the withdrawal, verifies the sender code, and generates an authorization response message approving or declining the withdrawal.

At step S565, the authorizing entity computer 190 sends the authorization response message to the transaction processing computer 140. In one embodiment in which the conditions on the token and/or recipient code specify that either or both are for one-time use, the transaction processing computer 140 may retrieve and invalidate the token and/or recipient code if the authorization response message indicates that the withdrawal is approved. Thus, if another request to withdraw money using the token and/or recipient code is received at the transaction processing computer 140, the transaction processing computer 140 may decline the request. In another embodiment in which the conditions on the token and/or recipient code specify that either or both are for limited-time use (e.g., three-time use), the transaction processing computer 140 may increment a counter associated with the token and/or recipient code, such that when the maximum number of uses is reached, the token and/or recipient code may be invalidated.

At step S570, the transaction processing computer 140 sends the authorization response message to the transport computer 180. At step S575, the transport computer 180 instructions the ATM 170 to either provide the requested money or the decline the transaction based on the authorization response message. If the withdrawal is approved, the ATM 170 provides the requested money to the recipient associated with recipient communication device 160.

At a later point in time (e.g., at the end of the day), a clearing and settlement process can be conducted between the transaction processing computer 140, the authorizing entity computer 190, and the transport computer 180 associated with ATM 170. The ATM 170 may first provide a file with the token and the associated transaction data (e.g., the amount) to the transport computer 180. The transport computer 180 may then transmit any clearing and settlement messages to the transaction processing computer 140 using the token. The token may then be converted to the credential as described above to facilitate the exchange of messages and the transfer of funds between the transport computer 180 and the authorizing entity computer 190.

Figure 6:
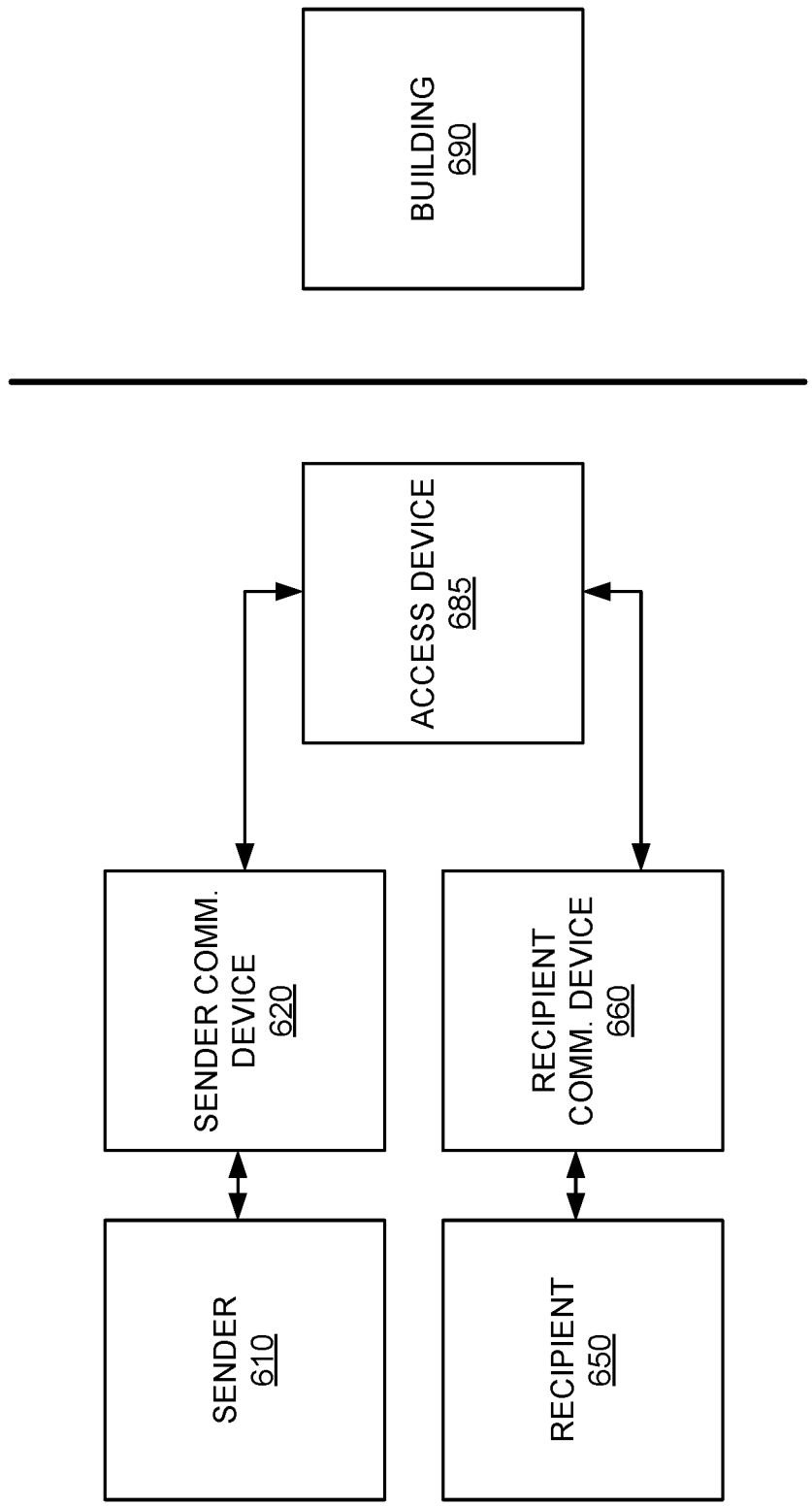
FIG. 6 shows a block diagram of a building access system according to embodiments of the present invention.

Generating a token associated with a credential and a recipient code associated with a sender code in order to transfer resource access can be applied outside of financial transaction contexts as well. For example, embodiments of the invention may be utilized to designate certain access privileges to a recipient who may provide a token and recipient code in order to be granted access. For example, FIG. 6 shows a block diagram of a building access system according to embodiments of the invention.

A sender 610 operates a sender communication device 620 having a credential (e.g., access rights) associated with a sender code securing the access rights. Sender 610 may request that a subset of his or her access rights be provided to recipient 650 via recipient communication device 660. The request may include a recipient identifier (e.g., a mobile phone number) associated with recipient 650. Recipient 650 may receive a token corresponding to the credential and a recipient code associated with the sender code, e.g. on recipient communication device 660, and provision them to the recipient communication device 660.

Thereafter, both sender communication device 620 and recipient communication device 660 can interact with access device 685 and pass their respective credentials (credential and sender code, with respect to sender communication device 620; and token and recipient code, with respect to recipient communication device 660) to access device 685. The access device 685 may locally analyze the credentials to determine whether access should be granted to building 690, or it may communicate with a remotely located server computer (not shown). The remotely located server computer may analyze the security notification data to determine whether access should be granted to building 690, and may transmit a signal indicating this back to the access device 685. The access device 685 may then proceed to allow or deny access by the sender 610 and/or the recipient 650 to the building 690, in accordance with the respective data elements.

Embodiments of the invention provide a number of advantages. Because the recipient is only provided with a token corresponding to a credential and a recipient code corresponding to a sender code, security is maintained for the sender's sensitive information (e.g., PAN and PIN number). Further, because the token and recipient code can be used only under certain conditions in some embodiments (e.g., a location at which the money may be withdrawn, a certain number of uses, etc.), the likelihood of fraudulent use of the token and recipient code are reduced. In addition, because the recipient code is not directly tied to the credential, risk of fraud is further limited.

Further, these systems and methods can allow a sender to conveniently transfer resource access from any location and at any time of the day. In the case of money transfers, the recipient can quickly and directly obtain the money (e.g., without having to go through a bank account) from any ATM location associated with any bank and at any time of the day, even without having a bank account at that bank, the sender's bank, or any other bank. In addition, the sender need only know how to get into contact with the recipient (i.e., have a recipient identifier) in order to transfer resource access to a recipient. Sensitive recipient information (e.g., an account number) is not needed.

From an implementation standpoint, no infrastructure changes are needed for the transport computer and/or the authorizing entity computer to implement the systems and methods described herein. Although the process begins as a push transaction (i.e., a sender pushing a payment to a recipient), it is ultimately processed as a traditional ATM pull transaction with which the transport computer and the authorizing entity computer already know how to process. To the transport computer and the authorizing entity computer, it appears that the recipient is simply withdrawing money from his or her own bank account.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although specific functions and methods have been described with respect to transaction processing computer 120 in FIG. 6, such functions could be performed by other computers such as the authorizing entity computer 140.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   receiving, at a server computer, a first request to transfer access to a resource from a sender to a recipient, the first request including an account identifier associated with the sender and a recipient identifier, wherein the account identifier is associated with a sender code;

generating, by the server computer, a token corresponding to the account identifier and a recipient code associated with the sender code;

sending, by the server computer, the token and the recipient code to the recipient using the recipient identifier;

receiving, by the server computer, a second request to access the resource, the second request including the token and the recipient code;

translating, by the server computer, the token into the account identifier and the recipient code into the sender code; and processing, by the server computer, the second request using the account identifier and the sender code.

2. The method of claim 1, further comprising:

after processing the second request, invalidating the token and the recipient code.

3. The method of claim 2, further comprising:

after invalidating the token and the recipient code, receiving a third request to access the resource, the third request including the token and the recipient code; and declining the third request.

4. The method of claim 1, wherein the recipient code is generated after being selected by the sender.

5. The method of claim 1, wherein the recipient identifier is associated with a mobile device of the recipient.

6. The method of claim 5, further comprising:

provisioning the mobile device of the recipient with the token.

7. The method of claim 1, wherein the first request specifies at least one condition under which the second request must be received.

8. The method of claim 7, wherein the conditions comprise at least one of a maximum duration of time between receiving the first request and receiving the second request, and a location associated with the second request.

9. The method of claim 1, wherein the second request is to access a first portion of the resource.

10. The method of claim 9, further comprising:

receiving a third request to access a second portion of the resource, the third request including the token and the recipient code;

translating, by the server computer, the token into the account identifier and the recipient code into the sender code; and processing, by the server computer, the third request using the account identifier and the sender code.

11. The method of claim 1, wherein at least one of the sender code and the recipient code is a PIN number.

12. A server computer comprising:

a processor; and a memory element comprising code, executable by the processor, for implementing a method comprising:

receiving a first request to transfer access to a resource from a sender to a recipient, the first request including an account identifier associated with the sender and a recipient identifier, wherein the account identifier is associated with a sender code;

generating a token corresponding to the account identifier and a recipient code associated with the sender code;

sending the token and the recipient code to the recipient using the recipient identifier;

receiving a second request to access the resource, the second request including the token and the recipient code;

translating the token into the account identifier and the recipient code into the sender code; and processing the second request using the account identifier and the sender code.

13. The server computer of claim 12, the method further comprising:

after processing the second request, invalidating the token and the recipient code.

14. The server computer of claim 13, the method further comprising:

after invalidating the token and the recipient code, receiving a third request to access the resource, the third request including the token and the recipient code; and declining the third request.

15. The server computer of claim 12, wherein the recipient code is generated after being selected by the sender.

16. The server computer of claim 12, wherein the recipient identifier is associated with a mobile device of the recipient.

17. The server computer of claim 16, the method further comprising:

provisioning the mobile device of the recipient with the token.

18. The server computer of claim 12, wherein the first request specifies at least one condition under which the second request must be received.

19. The server computer of claim 18, wherein the conditions comprise at least one of a maximum duration of time between receiving the first request and receiving the second request, and a location associated with the second request.

20. The server computer of claim 12, wherein the second request is to access a first portion of the resource.

21. The server computer of claim 20, the method further comprising:

receiving a third request to access a second portion of the resource, the third request including the token and the recipient code;

translating, by the server computer, the token into the account identifier and the recipient code into the sender code; and processing, by the server computer, the third request using the account identifier and the sender code.

22. The server computer of claim 12, wherein at least one of the sender code and the recipient code is a PIN number.

* * * * *